United States Patent
Meier

[11] Patent Number: 6,076,151
[45] Date of Patent: Jun. 13, 2000

[54] DYNAMIC MEMORY ALLOCATION SUITABLE FOR STRIDE-BASED PREFETCHING

[75] Inventor: Stephan G. Meier, Mountain View, Calif.

[73] Assignee: Advanced Micro Devices, Inc., Sunnyvale, Calif.

[21] Appl. No.: 08/948,947

[22] Filed: Oct. 10, 1997

[51] Int. Cl.[7] .................................................. G06F 17/30
[52] U.S. Cl. ...................... 711/171; 711/170; 711/172; 711/201; 711/202; 707/205; 707/206
[58] Field of Search .................................. 711/170, 171, 711/172, 201, 202; 707/205, 206

[56] References Cited

U.S. PATENT DOCUMENTS

| | | | |
|---|---|---|---|
| 4,912,629 | 3/1990 | Shuler, Jr. ................................. | 707/206 |
| 4,989,134 | 1/1991 | Shaw ....................................... | 707/206 |
| 5,261,088 | 11/1993 | Baird et al. ............................. | 707/206 |
| 5,357,618 | 10/1994 | Mirza et al. ............................. | 711/3 |
| 5,561,786 | 10/1996 | Morse ..................................... | 711/170 |
| 5,623,654 | 4/1997 | Peterman ............................... | 707/206 |
| 5,787,447 | 7/1998 | Smithline et al. ...................... | 707/206 |

OTHER PUBLICATIONS

Kernighan et al., "The C Programming Language," Prentice Hall, Englewood Cliffs, New Jersey, 1978, pp. 96–99 and 173–177.

*Primary Examiner*—Do Hyun Yoo
*Assistant Examiner*—Than Nguyen
*Attorney, Agent, or Firm*—Conley, Rose & Tayon, P.C.; Lawrence J. Merkel

[57] ABSTRACT

A dynamic memory allocation routine maintains an allocation size cache which records the address of a most recently allocated memory block for each different size of memory block that has been allocated. Upon receiving a dynamic memory allocation request, the dynamic memory allocation routine determines if the requested size is equal to one of the sizes recorded in the allocation size cache. If a matching size is found, the dynamic memory allocation routine attempts to allocate a memory block contiguous to the most recently allocated memory block of that matching size. If the contiguous memory block has been allocated to another memory block, the dynamic memory allocation routine attempts to reserve a reserved memory block having a size which is a predetermined multiple of the requested size. The requested memory block is then allocated at the beginning of the reserved memory block. By reserving the reserved memory block, the dynamic memory allocation routine may increase the likelihood that subsequent requests for memory blocks having the requested size can be allocated in contiguous memory locations.

18 Claims, 9 Drawing Sheets

DYNAMIC MEMORY ALLOCATION SUITABLE FOR STRIDE-BASED PREFETCHING

BACKGROUND OF THE INVENTION

1. Field of the Invention

This invention is related to dynamic memory allocation for computer systems.

2. Description of the Related Art

Modern microprocessors are demanding increasing memory bandwidth to support the increased performance achievable by the microprocessors. Increasing clock frequencies (i.e. shortening clock cycles) employed by the microprocessors allow for more data and instructions to be processed per second, thereby increasing bandwidth requirements. Furthermore, modern microprocessor microarchitectures are improving the efficiency at which the microprocessor can process data and instructions. Bandwidth requirements are increased even further due to the improved processing efficiency.

Computer systems typically have a relatively large, relatively slow main memory. Typically, multiple dynamic random access memory (DRAM) modules comprise the main memory system. The large main memory provides storage for a large number of instructions and/or a large amount of data for use by the microprocessor, providing faster access to the instructions and/or data then may be achieved from a disk storage, for example. However, the access times of modern DRAMs are significantly longer than the clock cycle length of modern microprocessors. The memory access time for each set of bytes being transferred to the microprocessor is therefore long. Accordingly, the main memory system is not a low latency system. Microprocessor performance may suffer due to the latency of the memory system.

In order to increase performance, microprocessors may employ prefetching to "guess" which data will be requested in the future by the program being executed. If the guess is correct, the delay of fetching the data from memory has already occurred when the data is requested (i.e. the requested data may be available within the microprocessor). In other words, the effective latency of the data is reduced. The microprocessor may employ a cache, for example, and the data may be prefetched from memory into the cache. The term prefetch, as used herein, refers to transferring data into a microprocessor (or cache memory attached to the microprocessor) prior to a request for the data being generated via execution of an instruction within the microprocessor. Generally, prefetch algorithms are based upon the pattern of accesses which have been performed in response to the program being executed. A popular data prefetch algorithm is the stride-based prefetch algorithm in which the difference between the addresses of consecutive accesses (the "stride") is added to subsequent access addresses to generate a prefetch address.

Stride-based prefetch algorithms often work well with statically allocated data structures. Data structures are statically allocated if they are allocated memory at the initiation of a program and remain allocated in that same memory throughout execution of the program. Because the data structure is statically allocated, it is generally laid out in contiguous memory locations. Stride-based prefetch algorithms work well because the memory storing the data structure is contiguous and the reference patterns are regular. A statically allocated array, for example, may be traversed by reading memory locations which are separated from each other by a regular interval. After just a few memory fetches, the stride-based prefetch algorithm may have learned the regular interval and may correctly predict subsequent memory fetches.

On the other hand, data structures are dynamically allocated if the memory for the data structures is allocated and deallocated as needed during the execution of the program. Dynamically allocated data structures have a variety of advantages in programs in which the amount of memory needed for the data structure varies widely and is difficult or impossible to predict ahead of time. Instead of statically allocating a very large amount of memory, the memory is allocated as needed. Memory space is thereby conserved.

Unfortunately, dynamic memory allocation algorithms are typically not conducive to prefetch algorithms. Dynamic memory allocation algorithms typically employ a "first fit" approach in which the first available memory block which includes at least the number of bytes requested for allocation is selected, or a "best fit" approach in which the available memory is scanned for a memory block which is closest in size to the requested number of bytes or causes the least amount of fragmentation if allocated to the request. These approaches select memory locations which may have no logical relation to other memory locations allocated to the data structure. Therefore, traversing the data structure generally does not involve regular intervals between the elements. A stride-based prefetch algorithm would have a low likelihood of prefetching the correct memory locations for such a dynamically allocated data structure. Other prefetch algorithms have similar difficulties, as the pattern of accesses is ill-defined. As used herein, a "memory block" comprises one or more contiguous bytes of memory allocated in response to a dynamic memory allocation request.

SUMMARY OF THE INVENTION

The problems outlined above are in large part solved by a dynamic memory allocation routine in accordance with the present invention. The dynamic memory allocation routine maintains an allocation size cache which records the address of a most recently allocated memory block for each different size of memory block that has been allocated. Upon receiving a dynamic memory allocation request, the dynamic memory allocation routine determines if the requested size is equal to one of the sizes recorded in the allocation size cache. If a matching size is found, the dynamic memory allocation routine attempts to allocate a memory block contiguous to the most recently allocated memory block of that matching size. If the contiguous memory block has been allocated to another memory block, the dynamic memory allocation routine attempts to reserve a reserved memory block having a size which is a predetermined multiple of the requested size. The requested memory block is then allocated at the beginning of the reserved memory block. By reserving the reserved memory block, the dynamic memory allocation routine may increase the likelihood that subsequent requests for memory blocks having the requested size can be allocated in contiguous memory locations. Upon allocating a memory block in response to a dynamic memory allocation request, the dynamic memory allocation routine updates the size allocation cache to reflect the allocation.

Advantageously, elements of a dynamic memory structure (e.g. a dynamic data structure) may be allocated memory which is contiguous to other elements of the data structure. A stride-based data prefetch mechanism may thereby more accurately predict addresses to be fetched when the dynamic data structure is repeatedly accessed (e.g. to traverse the dynamic data structure). Performance of computer programs which use dynamic data structures may be improved when executing upon a computer system employing the dynamic memory allocation routine described herein.

The dynamic memory allocation routine described herein takes advantage of the characteristics exhibited by many programs employing dynamic data structures. Often, these programs may employ several dynamic data structures. Each data structure generally includes data elements having a fixed size, but the size of the data elements in different data structures may often differ. Therefore, memory allocation requests for data elements of a particular size may typically be requests corresponding to data elements within the same data structure. Allocating contiguous memory to data elements having a particular size may thereby lead to regular access patterns when accessing these elements within the corresponding dynamic data structure. In this manner, stride-based prefetching may become more useful in accessing dynamic data structures.

Broadly speaking, the present invention contemplates a method for dynamic memory allocation in a computer system. A first request for dynamic allocation of a first memory block including a first number of bytes is received. The first memory block is allocated at a first address succeeding a second address corresponding to a last byte of a previously allocated memory block having the first number of bytes. Alternatively, the first memory block is allocated at a third address if the previously allocated memory block has a second number of bytes not equal to the first number of bytes.

The present invention further contemplates a computer storage medium configured to store a dynamic memory management routine which, in response to a first request for a dynamic allocation of a first memory block having a first number of bytes: (i) allocates the first memory block at a first address contiguous to a second memory block having the first number of bytes; or (ii) allocates the first memory block at a second address discontiguous to the second memory block if the second memory block has a second number of bytes not equal to the first number of bytes.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
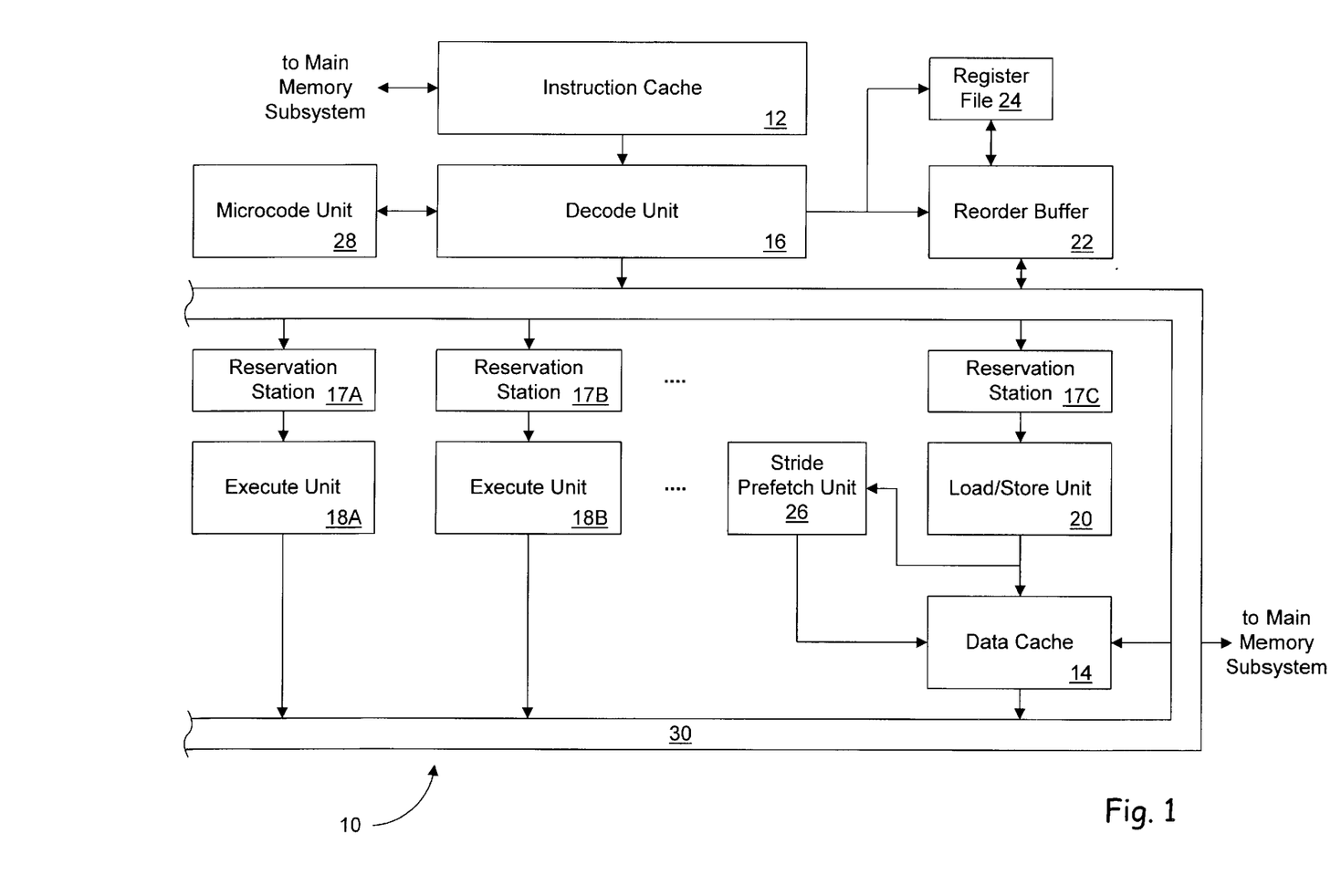
FIG. 1 is a block diagram of one embodiment of a microprocessor include a stridebased prefetch unit.

Turning now to FIG. 1, a block diagram of one embodiment of a microprocessor 10 is shown. Microprocessor 10 includes an instruction cache 12, a data cache 14, a decode unit 16, a plurality of reservation stations including reservation stations 17A, 17B, and 17C, a plurality of execute units including execute units 18A and 18B, a load/store unit 20, a reorder buffer 22, a register file 24, a stride prefetch unit 26, and a microcode unit 28. Elements referred to herein with a particular reference number followed by a letter will be collectively referred to by the reference number alone. For example, the plurality of execute units will be collectively referred to herein as execute units 18. Execute units 18 may include more execute units than execute units 18A and 18B shown in FIG. 1. Additionally, an embodiment of microprocessor 10 may include one execute unit 18.

As shown in FIG. 1, instruction cache 12 is coupled to a main memory subsystem (not shown) and to a decode unit 16, which is further coupled to reservation stations 17, reorder buffer 22, register file 24, and microcode unit 28. Reorder buffer 22, execute units 18, and data cache 14 are each coupled to a result bus 30 for forwarding of execution results. Furthermore, each reservation station 17A and 17B is coupled to a respective execute unit 18A and 18B, while reservation station 17C is coupled to load/store unit 20. Each reservation station 17 is coupled to receive operand information from reorder buffer 22. Load/store unit 20 is coupled to data cache 14, which is further coupled to the main memory subsystem. Additionally, stride prefetch unit 26 is coupled to load/store unit 20 and data cache 14.

Generally speaking, microprocessor 10 includes stride prefetch unit 26 for performing stride-based prefetching. Other embodiments of microprocessor 10 may include prefetch units employing a variety of other prefetch algorithms. Stride prefetch unit 26 monitors the cache accesses performed by load/store unit 20 in order to learn the stride (or strides) between accesses. Additionally, stride prefetch unit 26 monitors the accesses in order to generate prefetch accesses. According to one embodiment, stride prefetch unit 26 prefetches an address which is the sum of an access address provided by load/store unit 20 to data cache 14 and a stride learned by stride prefetch unit 26 from previous access addresses. The prefetch address is provided to data cache 14 to determine if a hit occurs. If a miss occurs in data cache 14, the prefetch address is forwarded to the main memory subsystem for retrieving the corresponding cache line from main memory.

Stride prefetch unit 26 may be configured to detect multiple strides corresponding to different streams of data accesses. Stride prefetch unit 26 may differentiate the different streams by limiting the maximum stride between addresses. If the stride between two consecutive addresses exceeds the maximum stride, then the two addresses are assumed to be from different streams of data accesses. Alternatively, the type of load/store memory operation performed to generate the addresses may differentiate streams. For example, the size of the data being accessed (e.g. byte, word, doubleword, etc.) may be the same for accesses within a stream but different between accesses which belong to different streams. Similarly, sign extension/zero extension and other similar properties of the memory operations may be used to differentiate streams.

According to one embodiment, the dynamic memory allocation routine employed within a computer system including microprocessor 10 uses a memory allocation algorithm intended to improve the effectiveness of stride prefetch unit 26. The dynamic memory allocation routine maintains an allocation size cache which records the address of the most recently allocated memory block for each size of memory block that has been allocated. If a request for allocation of a memory block is received and the requested size equals one of the sizes recorded in the allocation size cache, then the dynamic memory allocation routine attempts to allocate memory contiguous to the previously allocated memory block of that size. Advantageously, memory blocks of the same size may often be allocated in contiguous memory locations. If the memory blocks are part of the same data structure, a traversal of the data structure may be correctly prefetched using stride based prefetching. For example, a linked list of elements to which elements are usually added at one end of the list may receive contiguous memory allocations for the added elements. As the list is traversed (a relatively common operation in linked lists), each element will often be at a fixed stride away from the previous element. Therefore, prefetching based on the stride may cause each element in the list to be prefetched. Using a dynamic memory allocation algorithm as described herein may thereby improve prefetch effectiveness for dynamic data structures. As used herein, the term routine refers to a series of instructions arranged to perform a particular function when executed upon microprocessor 10 or another microprocessor which is configured to execute the instruction set defining the instructions.

Instruction cache 12 is a high speed cache memory for storing instructions. It is noted that instruction cache 12 may be configured into a set-associative or direct mapped configuration. Instruction cache 12 may additionally include a branch prediction mechanism for predicting branch instructions as either taken or not taken. Instructions are fetched from instruction cache 12 and conveyed to decode unit 16 for decode and dispatch to a reservation station 17.

Decode unit 16 decodes each instruction fetched from instruction cache 12. Decode unit 16 dispatches the instruction to one or more of reservation stations 17 depending upon the type of instruction detected. More particularly, decode unit 16 produces a decoded instruction in response to each instruction fetched from instruction cache 12. The decoded instruction comprises control signals to be used by execute units 18 and/or load/store unit 20 to execute the instruction. For example, if a given instruction includes a memory operand, decode unit 16 may signal load/store unit 20 to perform a load/store (i.e. read/write) memory operation in response to the given instruction.

Decode unit 16 also detects the register operands used by the instruction and requests these operands from reorder buffer 22 and register file 24. In one embodiment, execute units 18 are symmetrical execution units. Symmetrical execution units are each configured to execute a particular subset of the instruction set employed by microprocessor 10. The subsets of the instruction set executed by each of the symmetrical execution units are the same. In another embodiment, execute units 18 are asymmetrical execution units configured to execute dissimilar instruction subsets. For example, execute units 18 may include a branch execute unit for executing branch instructions, one or more arithmetic/logic units for executing arithmetic and logical instructions, and one or more floating point units for executing floating point instructions. Decode unit 16 dispatches an instruction to a reservation station 17 which is coupled to an execute unit 18 or load/store unit 20 which is configured to execute that instruction.

Microcode unit 28 is included for handling instructions for which the architecturally defined operation is more complex than the hardware employed within execute units 18 and load/store unit 20 may handle. Microcode unit 28 parses the complex instruction into multiple instructions which execute units 18 and load/store unit 20 are capable of executing. Additionally, microcode unit 28 may perform functions employed by microprocessor 10. For example, microcode unit 28 may perform instructions which represent a context switch. Generally speaking, the "context" of a program comprises the state needed to correctly run that program. Register values created by the program are included in the context, as are the values stored in any memory locations used by the program. Microcode unit 28 causes the context stored within microprocessor 10 to be saved to memory at a predefined memory location (according to the microprocessor architecture employed by microprocessor 10) and restores the context of the program being initiated. Context switches may occur in response to an interrupt being signalled to microprocessor 10, for example.

Load/store unit 20 provides an interface between execute units 18 and data cache 14. Load and store memory operations are performed by load/store unit 20 to data cache 14. Additionally, memory dependencies between load and store memory operations are detected and handled by load/store unit 20. Generally speaking, a "memory operation" is performed to transfer data between the main memory and microprocessor 10. A load memory operation specifies the transfer of data from one or more memory locations within the main memory to microprocessor 10. On the other hand, a store memory operation specifies the transfer of data from microprocessor 10 to one or more memory locations within the main memory. The memory location or locations accessed by a given memory operation are identified within the main memory by an address corresponding to the given memory operation.

Reservation stations 17 are configured to store instructions whose operands have not yet been provided. An instruction is selected from those stored in a reservation station 17A–17C for execution if: (1) the operands of the instruction have been provided, and (2) the instructions within the reservation station 17A–17C which are prior to the instruction being selected in program order have not yet received operands. It is noted that a centralized reservation station may be included instead of separate reservations stations. The centralized reservation station is coupled between decode unit 16, execute units 18, and load/store unit 20. Such an embodiment may perform the dispatch function within the centralized reservation station.

Microprocessor 10 supports out of order execution, and employs reorder buffer 22 for storing execution results of speculatively executed instructions and storing these results into register file 24 in program order, for performing dependency checking and register renaming, and for providing for mispredicted branch and exception recovery. When an instruction is decoded by decode unit 16, requests for register operands are conveyed to reorder buffer 22 and register file 24. In response to the register operand requests, one of three values is transferred to the reservation station 17A–17C which receives the instruction: (1) the value stored in reorder buffer 22, if the value has been speculatively generated; (2) a tag identifying a location within reorder buffer 22 which will store the result, if the value has not been speculatively generated; or (3) the value stored in the register within register file 24, if no instructions within reorder buffer 22 modify the register. Additionally, a storage location within reorder buffer 22 is allocated for storing the results of the instruction being decoded by decode unit 16. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register.

When execute units 18 or load/store unit 20 execute an instruction, the tag assigned to the instruction by reorder buffer 22 is conveyed upon result bus 30 along with the result of the instruction. Reorder buffer 22 stores the result in the indicated storage location. Additionally, reservation stations 17 compare the tags conveyed upon result bus 30 with tags of operands for instructions stored therein. If a match occurs, the unit captures the result from result bus 30 and stores it with the corresponding instruction. In this manner, an instruction may receive the operands it is intended to operate upon. Capturing results from result bus 30 for use by instructions is referred to as "result forwarding".

Instruction results are stored into register file 24 by reorder buffer 22 in program order. Storing the results of an instruction and deleting the instruction from reorder buffer 22 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 22 discards the instructions subsequent to the mispredicted branch instructions. Instructions thus discarded are also flushed from reservation stations 17, execute units 18, load/store unit 20, and decode unit 16.

Register file 24 includes storage locations for each register defined by the microprocessor architecture employed by microprocessor 10. For example, microprocessor 10 may employ the x86 microprocessor architecture. For such an embodiment, register file 24 includes locations for storing the EAX, EBX, ECX, EDX, ESI, EDI, ESP, and EBP register values.

Data cache 14 is a high speed cache memory configured to store data to be operated upon by microprocessor 10. It is noted that data cache 14 may be configured into a set-associative or direct-mapped configuration. Data cache 14 allocates and deallocates storage for data in cache lines. A cache line is a block of contiguous bytes. The byte within the cache line which has the lowest numerical address is stored at an address which is aligned to a cache line boundary.

The main memory subsystem effects communication between microprocessor 10 and devices coupled thereto. For example, instruction fetches which miss instruction cache 12 may be transferred from a main memory by the main memory subsystem. Similarly, data requests performed by load/store unit 20 which miss data cache 14 may be transferred from main memory by the main memory subsystem. Additionally, data cache 14 may discard a cache line of data which has been modified by microprocessor 10. The main memory subsystem transfers the modified line to the main memory.

It is noted that decode unit 16 may be configured to dispatch an instruction to more than one execution unit. For example, in embodiments of microprocessor 10 which employ the x86 microprocessor architecture, certain instructions may operate upon memory operands. Executing such an instruction involves transferring the memory operand from data cache 14, executing the instruction, and transferring the result to memory (if the destination operand is a memory location) or data cache 14. Load/store unit 20 performs the memory operations, and an execute unit 18 performs the execution of the instruction.

Figure 2:
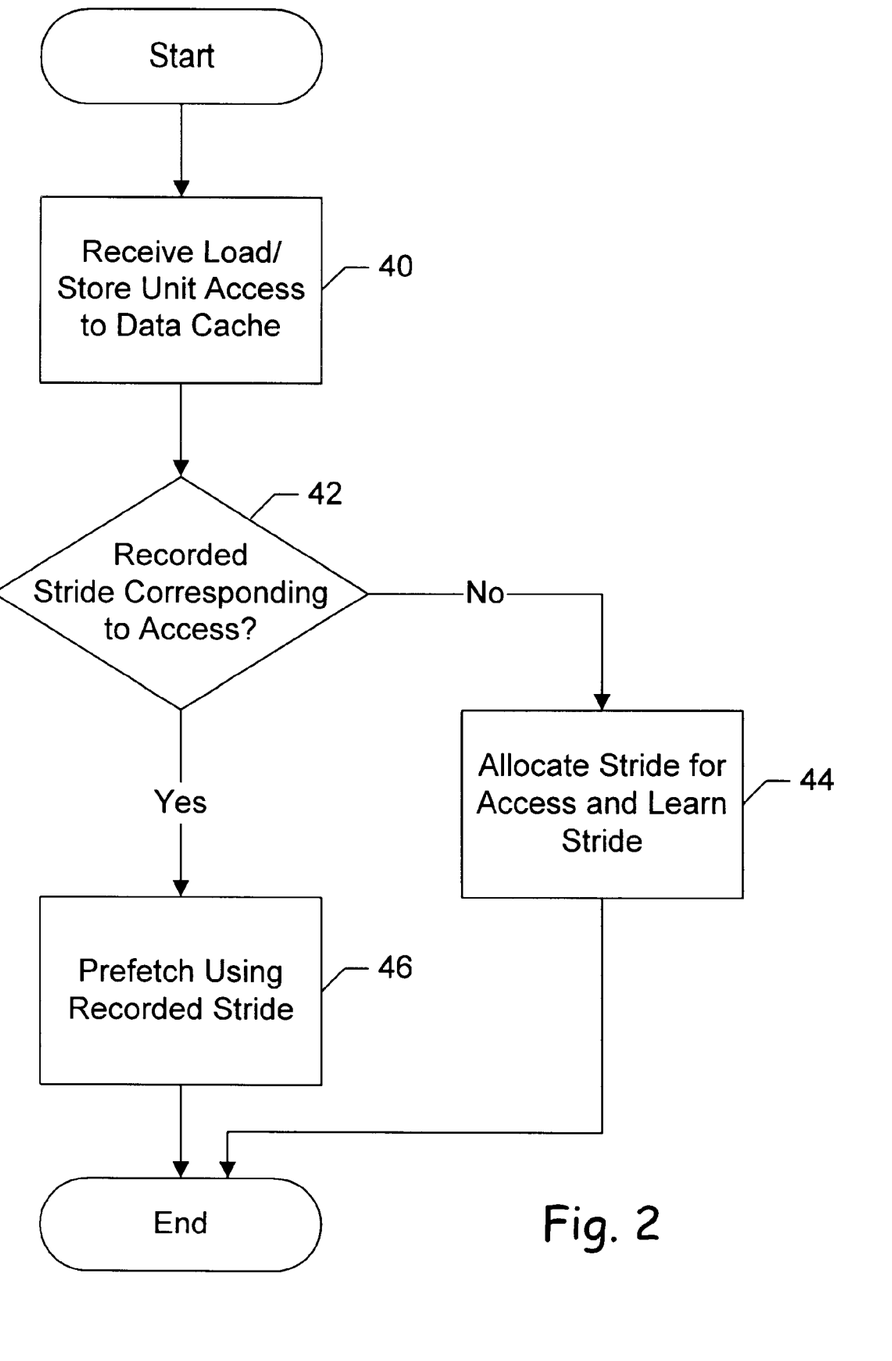
FIG. 2 is a flowchart illustrating operation of one embodiment of the stride-based prefetch unit shown in FIG. 1.

Turning now to FIG. 2, a flowchart illustrating operation of one embodiment of stride prefetch unit 26 is shown. Stride prefetch unit 26 detects a load/store unit 20 access to data cache 14 (step 40). As illustrated by decision block 42, stride prefetch unit 26 determines if it has a recorded stride corresponding to the access. As described above, various criteria may be used to determine if an access is within a stream of accesses corresponding to a particular stride. If no recorded stride corresponds to the access, stride prefetch unit 26 allocates a stride for the access and attempts to learn the stride (step 44). For example, stride prefetch unit 26 may record the access address and await another access which is determined to be within the same stream of data accesses. The stride may then be calculated from the addresses of the two accesses. Stride prefetch unit 26 is configured to track at least one stride, and may optionally be configured to track a predefined number of additional strides.

If the access detected from load/store unit 20 does correspond to a recorded stride, stride prefetch unit 26 generates a prefetch address by adding the access address and the corresponding stride (step 46). Stride prefetch unit 26 conveys the prefetch address to data cache 14 to determine if the prefetch address hits in the cache. If the prefetch address misses, data cache 14 conveys the prefetch address to the main memory subsystem.

It is noted that, in addition to learning strides and forming prefetch addresses from the strides and subsequent access addresses, stride prefetch unit 26 may be configured to monitor cache accesses performed by load/store unit 20 to determine the correctness of the prefetch addresses. If a prefetch address is incorrect, stride prefetch unit 26 may delete the stride which generated the prefetch address and attempt to learn a new stride. Alternatively, stride prefetch unit 26 may continuously update its recorded strides according to the pattern of accesses observed from load/store unit 20.

Figure 3:
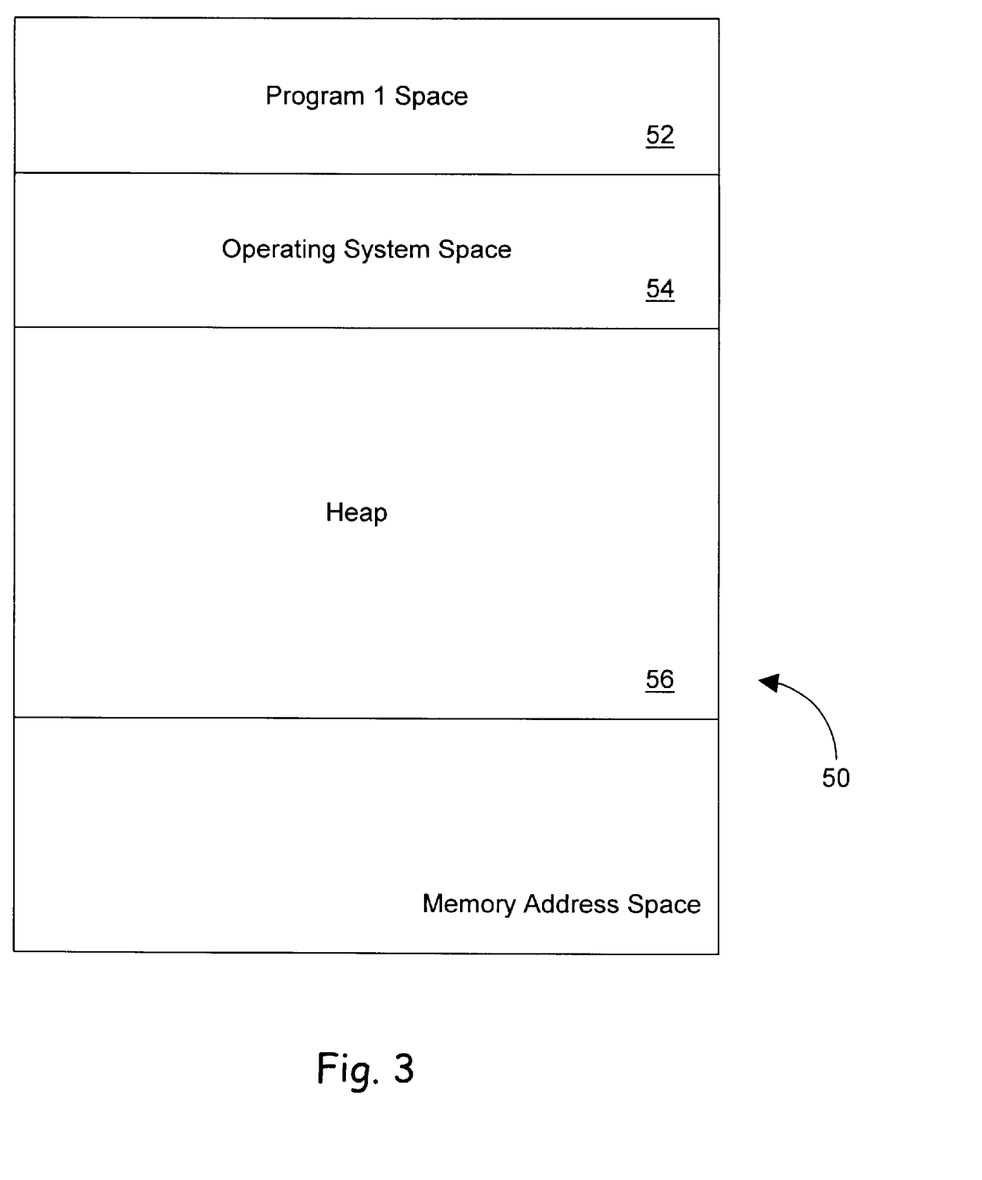
FIG. 3 is a diagram illustrating division of a memory space according to one embodiment of an operating system executed in a computer system including the microprocessor shown in FIG. 1.

Turning next to FIG. 3, a diagram illustrating a memory address space 50 is shown. Address space 50 is divided according to an operating system which executes upon microprocessor 10 within a computer system. The operating system divides the address space into portions for use by application programs (e.g. program 1 space 52), the operating system (e.g. operating system space 54), and a space referred to as the "heap" 56. Heap 56 is the portion of the memory which is reserved by the operating system for dynamic memory allocation. When the dynamic memory allocation routine is invoked in response to a memory allocation request, a memory block within heap 56 is allocated for use by the program performing the request. The dynamic memory allocation routine maintains a free list indicating which memory locations within heap 56 are currently unallocated, and selects a memory block from heap 56 for allocation. The algorithm employed for selecting the memory block is described above and in more detail below.

Figure 4:
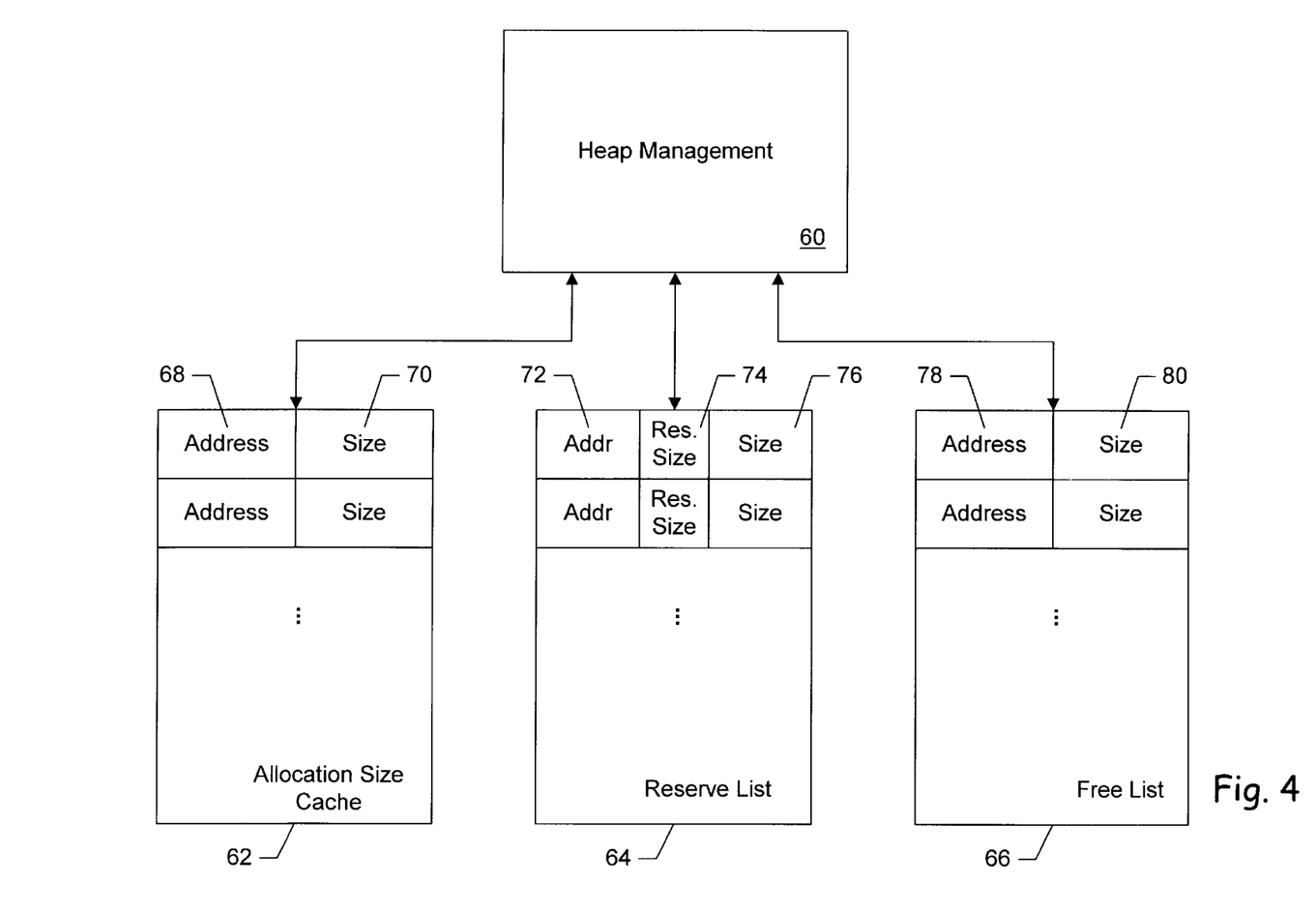
FIG. 4 is a block diagram illustrating one embodiment of a heap management routine and data structures maintained thereby.

Turning now to FIG. 4, a block diagram of one embodiment of a dynamic memory management routine (e.g. heap management routine 60) and data structures maintained by heap management routine 60 is shown. Heap management routine 60 maintains an allocation size cache 62, a reserve list 64, and a free list 66. Allocation size cache 62 includes an address field 68 and a size field 70 for each entry. Reserve list 64 includes an address field 72, a reserve size field 74, and a size field 76 for each entry. Finally, free list 66 includes an address field 78 and a size field 80 for each entry.

Heap management routine 60 is invoked in response to dynamic memory allocation requests from an application (i.e. non-operating system) program or from an operating system routine. Heap management routine 60 is preferably an operating system routine, but may be implemented as part of an application program, firmware, etc.

Upon allocating a memory block for a particular dynamic memory allocation request, heap management routine 60 updates allocation size cache 62 and free list 66. Free list 66 is a list of addresses 78 within heap 56 which begin a memory block which is not currently allocated to an application program or operating system routine. Corresponding to each address 78 is a size 80 which indicates the number of bytes within the memory block which are free (i.e. up to the first byte which is: (i) subsequent to the corresponding address 78 and (ii) allocated to an application program or operating system routine). Free list 66 therefore defines the portions of heap 56 which are available to satisfy dynamic memory allocation requests. Upon allocation of a memory block, free list 66 is updated to remove the memory block from the available area. If the allocated memory block is smaller than the memory block within free list 66 which contains the allocated memory block, the address is increased (and the size decreased) to remove the allocated memory block from free list 66. Alternatively, a memory block of exactly the requested size may be within free list 66, in which case the entry corresponding to the memory block may be deleted.

Allocation size cache 62 records the address of the most recently allocated memory block for each size of memory block that has been allocated. The address is recorded in address field 68 of an entry, while the size of the memory block is recorded in the corresponding size field 70. Upon allocating a memory block, heap management routine 60 either creates a new entry in allocation size cache 62 (if the requested size is not associated with a recorded entry already) or overwrites the address field 68 corresponding to the requested size recorded within a size field 70. In this manner, the allocation size cache 62 indicates which memory block was allocated for the most recent request for a memory block of a given size.

Heap management routine 60 attempts to allocate a memory block contiguous to a previously allocated memory block of the same size. Since dynamic data structures are often built using elements of a consistent size, elements of the dynamic data structure may be allocated in contiguous storage locations. As elements are added to a data structure, then, the elements may frequently be in contiguous memory locations and therefore at a fixed stride from other elements within the data structure.

If the memory block contiguous to the previously allocated memory block is not available (determined by examining free list 66), then heap management routine 60 attempts to reserve a memory block which is a predetermined multiple of the requested size. The requested memory block is allocated at the beginning of the reserved memory block. The remainder of the reserved memory block is reserved for other requests for a memory block of the same size as the allocated memory block. In other words, heap management routine 60 attempts to allocate subsequent memory blocks having a size different than the allocated memory block outside of the reserved memory block (unless no other locations within the heap can satisfy the request).

Reserve list 64 is used to record the reserved memory blocks. The reserved memory block is not removed from free list 66 until actually allocated to subsequent requests. In this manner, the reserved memory block is available if unreserved portions of free list 66 are completely allocated and another dynamic memory allocation request is received. Additionally, if an entry in allocation size cache 62 is found for a given dynamic memory request, the subsequent locations may be more likely to be allocatable since the subsequent locations are reserved. Each entry in reserve list 64 indicates the address at the beginning of the reserve block (address field 72), the size of the reserved block (reserve size field 74), and the size of the memory blocks for which the reserved memory block is reserved (size field 76). Upon allocating a memory block for which no matching entry is found in allocation size cache 62, heap management routine 60 allocates a memory block from free list 66 (preferably outside of the reserved memory blocks) and reserves a reserved memory block for requests of the size of the memory block (if possible). The reserved memory block includes the allocated memory block, and is recorded within reserve list 64.

The size of the reserve memory block (i.e. the predetermined multiple of the request size) may be related to the expected number of dynamic allocation requests to be received for that sized memory block. For example, a multiple within the range of 20–100 may be suitable. The multiple may depend upon the requested size. In particular, it may be advantageous to reserve a larger number of small memory blocks while reserving a smaller number of large memory blocks. Reserving a large number of large memory blocks may quickly occupy a large amount of the heap, while a large number of smaller memory blocks may be less susceptible to this problem.

It is noted that, instead of employing reserve list 64, heap management routine 60 may allocate the reserved memory block from free list 66. Heap management routine 60 would then maintain a list of allocated reserve memory blocks and allocate memory from within the allocated reserve memory blocks for subsequent dynamic memory allocation requests of the size corresponding to the reserve memory blocks. Other dynamic memory allocation requests may be satisfied with memory allocated from free list 66.

Figure 5:
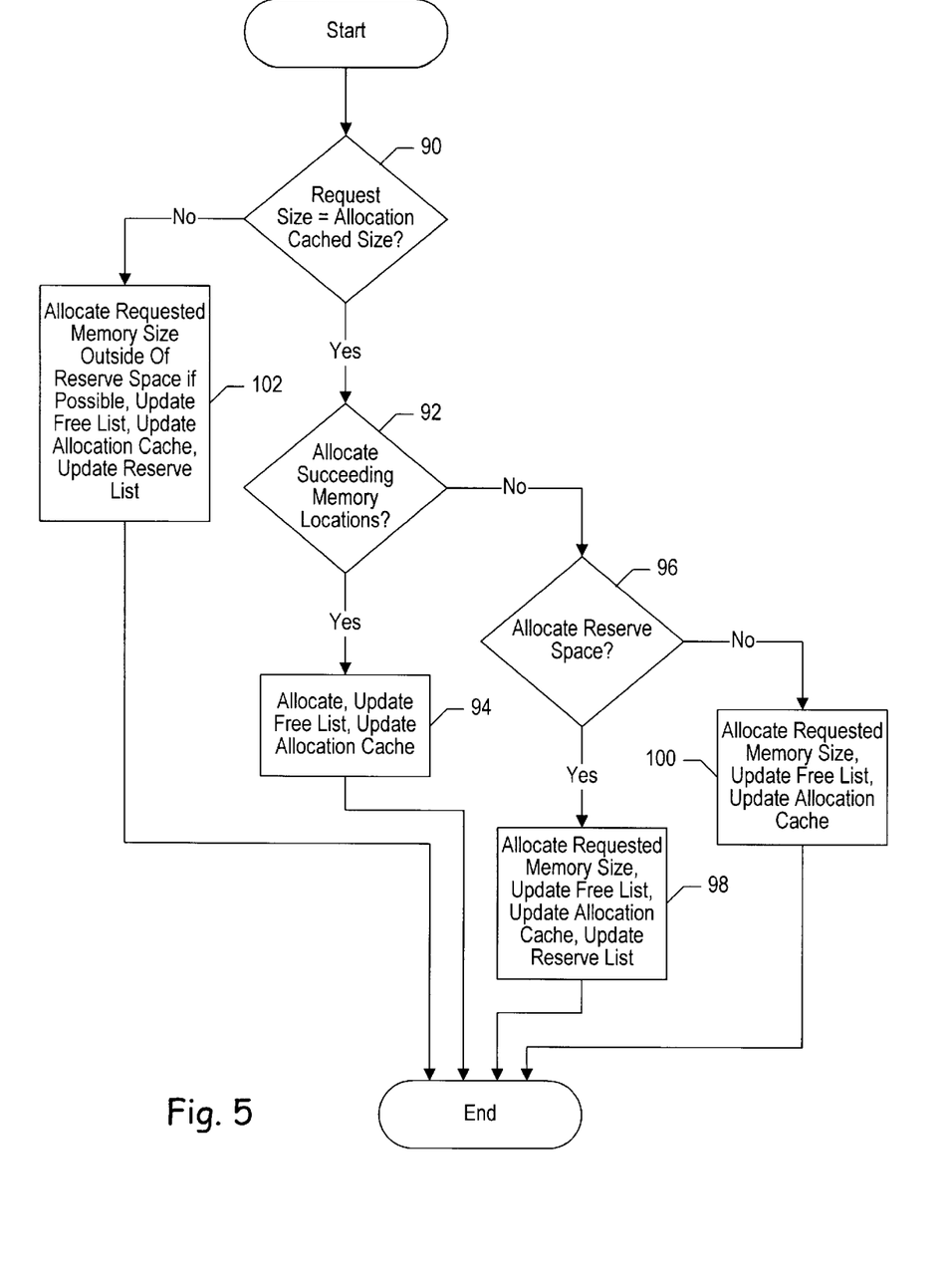
FIG. 5 is a flowchart illustrating dynamic memory allocation according to one embodiment of the heap management routine.

Turning now to FIG. 5, a flowchart illustrating the operation of one embodiment of heap management routine 60 in response to a dynamic memory allocation request is shown. Heap management routine 60 compares the requested size to the sizes recorded in allocation size cache 62 (decision block 90). If the requested size equals one of the sizes recorded in allocation size cache 62, the heap management routine 60 attempts to allocate the memory block contiguous to the previously allocated memory block of that size (e.g. by adding the address of the previously allocated memory block from address field 68 to the requested size). Heap management routine 60 checks free list 66 to determine the availability of the succeeding memory locations (i.e. the contiguous memory block) (decision block 92). If the contiguous memory block is available, then heap management routine 60 allocates the contiguous memory block (step 94). Heap management routine 60 updates free list 66 to remove the allocated memory block therefrom, and updates allocation size cache 62 to reflect the address of the allocated memory block (i.e. overwrites address field 68 of the corresponding entry with the address of the allocated memory block).

If, on the other hand, the contiguous memory block is not available, heap management routine 60 attempts to allocate a reserve memory block for memory blocks of the requested size (decision block 96). Heap management routine 60 searches free list 66 for a memory block having a size equal to or greater than the predetermined multiple of the request size. If a reserve block is located, the requested memory block is allocated at the beginning of the reserve memory block, and free list 66 is updated according to the requested size (step 98). Additionally, reserve list 64 is updated to indicate the size of the reserved memory block. The remainder of the reserved memory block (i.e. not including the allocation of the requested memory block) is not removed from free list 66 to facilitate usage of these memory locations by subsequent blocks of the requested size (which may allocate the contiguous memory block without regard to reserve list 64), and to facilitate usage of these memory locations for any memory request if the remainder of the heap becomes allocated. Still further, the corresponding entry within allocation size cache 62 is updated with the address of the newly allocated memory block (overwriting the address of the previously allocated memory block within address field 68).

If a memory block suitable for the reserve memory block is not located within free list 66, heap management routine 60 allocates the requested memory block, updates free list 66 to indicate the allocation, and updates allocation size cache 62 with the address of the allocated memory block (overwriting the previous address corresponding to the requested size) (step 100).

Returning to decision block 90, if a requested size is not found within allocation size cache 62, heap management routine 60 attempts to allocate the requested memory block outside of any reserve spaces listed in reserve list 64, if possible (step 102). If it is not possible to allocate the requested size outside of the reserved memory blocks, heap management routine 60 allocates a memory block within one of the reserved memory blocks. Heap management routine 60 may then delete the affected reserved memory block from reserve list 64. Additionally, heap management routine 60 may resort to a "first fit" or "best fit" approach to memory allocation in step 102 if allocation outside of the reserved memory blocks is not possible.

Upon allocation, free list 66 and allocation size cache 62 are updated with respect to the allocated memory block. If desired, a reserve memory block corresponding to the requested size may be formed at step 102 as well, and reserve list 64 may correspondingly be updated.

It is noted that, although the steps shown in the flowchart of FIG. 5 and other flowcharts herein are shown sequentially for allowing understanding, the flowcharts may be implemented using any set of steps which accomplishes the same operation.

Figure 6:
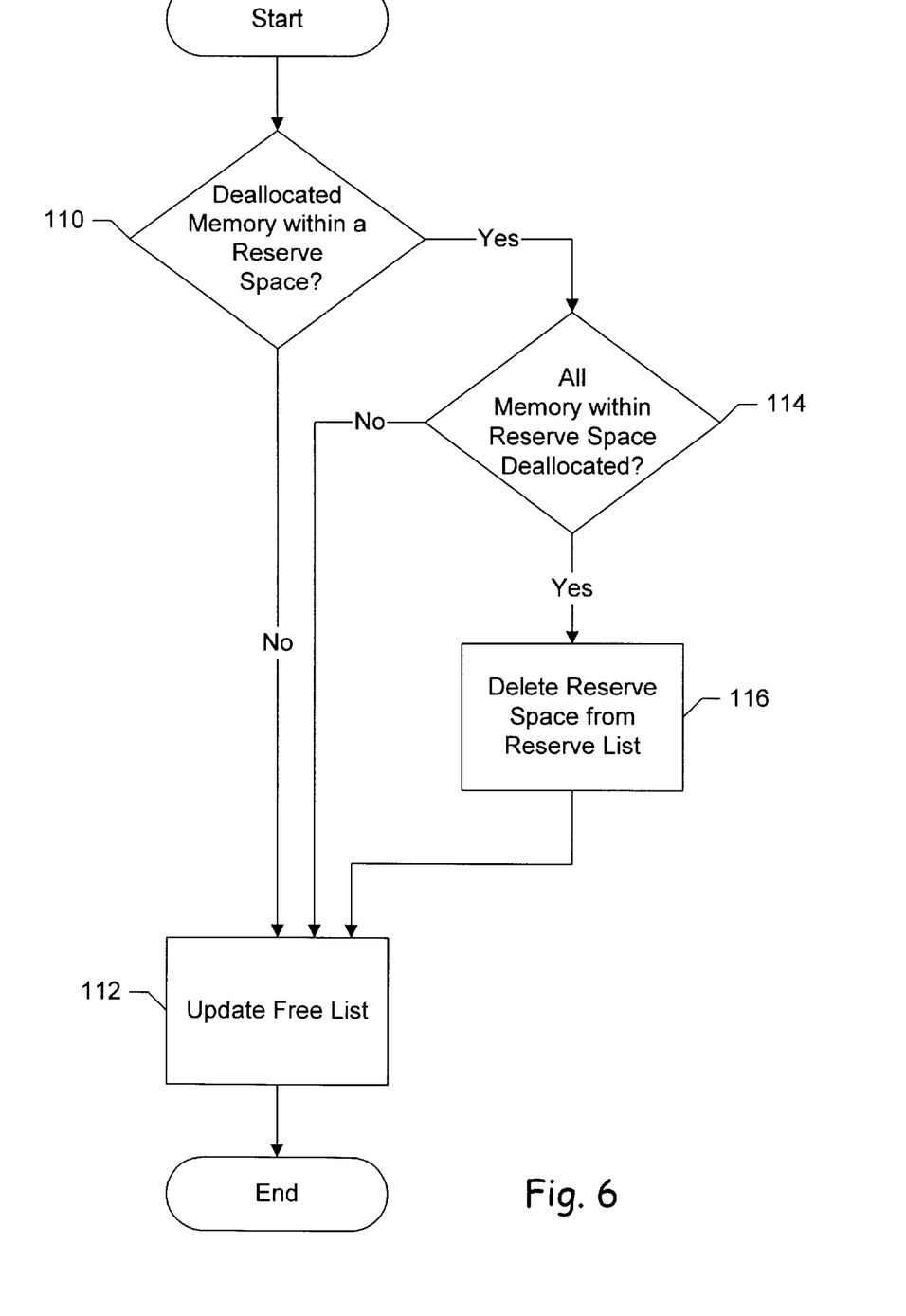
FIG. 6 is a flowchart illustrating dynamic memory deallocation according to one embodiment of the head management routine.

Turning next to FIG. 6, a flowchart illustrating operation of one embodiment of heap management routine 60 upon receiving a dynamic memory deallocation request is shown. Dynamic memory deallocation is often referred to as "freeing" memory. For example, in the "C" programming language, dynamic memory allocation may be accomplished using a "malloc" function call while dynamic memory deallocation may be accomplished using a "free" function call.

Heap management routine 60 determines if the deallocated memory block is within a reserved memory block by examining reserve list 64 (decision block 110). If the deallocated memory block is not within a reserved block, heap management routine 60 updates free list 66 to reflect the freed memory (step 112). On the other hand, if the deallocated memory block is within a reserved block, heap management routine 60 determines if the entire reserved memory block has been deallocated (decision block 114). If the entire reserved memory block has been deallocated, the entry corresponding to the reserved memory block is deleted from reserve list 64 (step 116). In either case, free list 66 is updated to reflect the freed memory.

Figure 7:
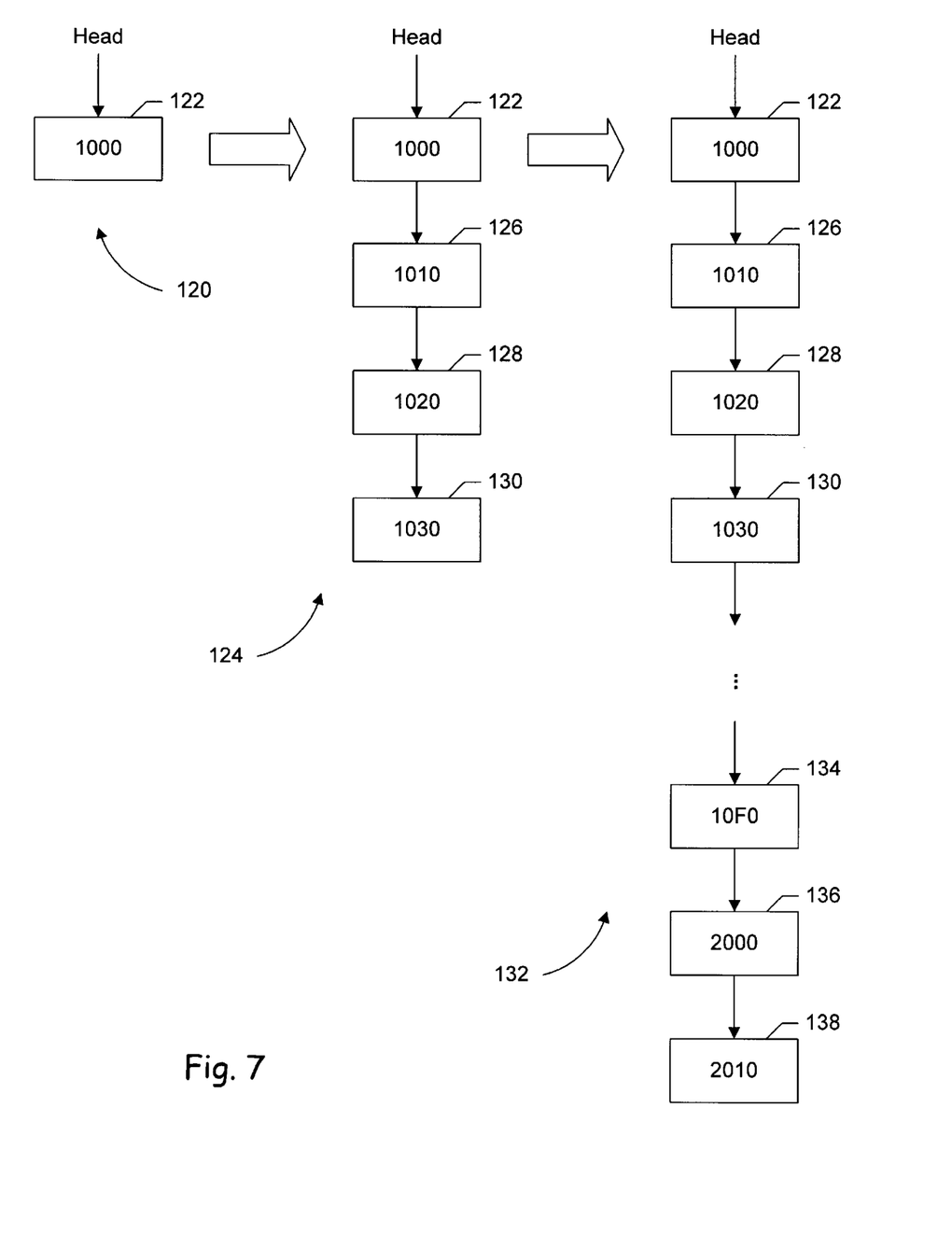
FIG. 7 is a first example of a dynamically allocated data structure according to one embodiment of the heap management routine.

Turning next to FIG. 7, a first example of a dynamically allocated data structure performed using one embodiment of heap management routine 60 is shown. The dynamically allocated data structure shown in FIG. 7 is a linked list. A linked list is a data structure in which each element in the list points to at least one other element in the list. Typically, the list elements are equal in size. A head pointer is used to identify the first element in the list. The first element in the list (in addition to storing an item in the list) points to the second element, which in turn points to the third element, etc. Elements may be added to the head of the list, the tail of the list, or within the list. For the remainder of this example, addresses will be expressed in hexadecimal format.

At reference numeral 120, the exemplary linked list is illustrated at a first point in time in which the list has one element 122 (allocated at an address 1000). The head pointer of the list points to element 122 (i.e. the head pointer has a value of 1000). During the dynamic memory allocation request for element 122, heap management routine 60 recorded the address 1000 and the size of element 122 in allocation size cache 62.

At reference numeral 124, the exemplary linked list is shown after several elements 126, 128, and 130 have been added. As each element 126–130 is added, heap management routine 60 attempts to allocate memory contiguous to the previous allocation. In the present example, elements 122 and 126–130 each include 16 bytes (10 in hexadecimal notation). Therefore, heap management routine 60 allocates memory blocks beginning at addresses 1010, 1020, and 1030. Additionally, heap management routine 60 in the present example reserves a memory block of 256 bytes (16 times the size of the elements . . . 16 bytes each). As illustrated at reference numeral 132, elements are successfully allocated at contiguous memory locations through element 134 at address 10F0. The next allocation of an element 136 occurs at an address 2000 in the example. Another memory block is reserved, thereby allowing element 138 to be allocated contiguous to element 136. It is noted that any multiple of the element size may be selected and that the size selected for this example is for exemplary purposes only.

Traversing the linked list shown in FIG. 7 comprises multiple accesses at a fixed stride from each other (e.g.

elements 122 and 126–130 shown at reference numeral 124 and elements 122, 126–130, and 134 shown at reference numeral 132). Traversing the linked list may therefore be successfully prefetched using a stride-based prediction method such as that employed by stride prefetch unit 26. At element 136, the prefetch may fail but may subsequently resume correct predictions beginning with element 138 or a subsequent element. The prefetch accuracy in general may be substantially higher than that achievable with a heap management algorithm which does not attempt to allocate like-sized memory blocks contiguously.

Figure 8:
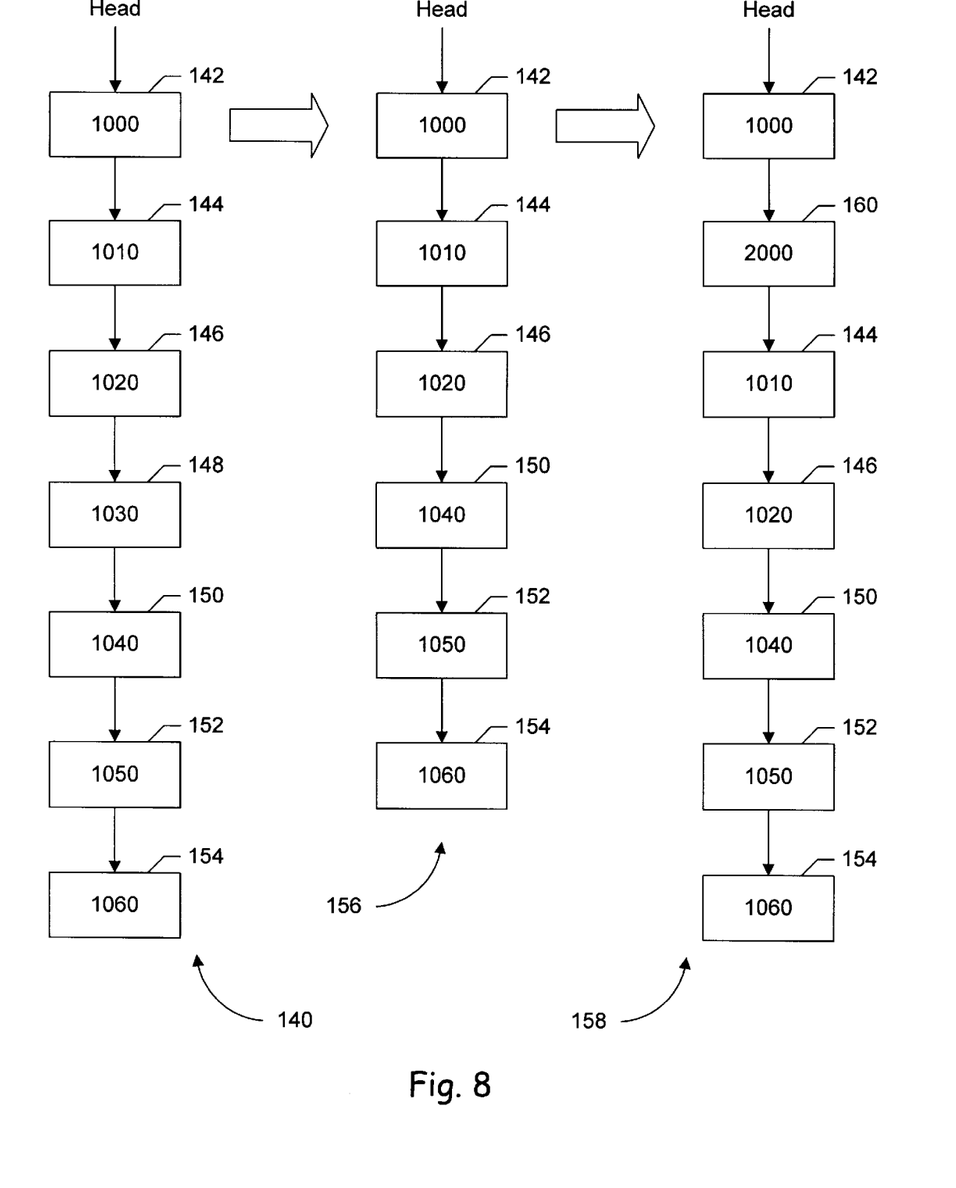
FIG. 8 is a second example of a dynamically allocated data structure according to one embodiment of the heap management routine.

Turning now to FIG. 8, a second example of a dynamically allocated data structure performed using one embodiment of heap management routine 60 is shown. The dynamically allocated data structure shown in FIG. 8 is again a linked list. For the remainder of this example, addresses will be expressed in hexadecimal format.

At reference numeral 140, the exemplary linked list is shown having elements 142, 144, 146, 148, 150, 152, and 154. Each element is separated from the subsequent element by an equal stride amount. Therefore, stride based prefetching may successfully fetch each of the items in the list.

At reference numeral 156, the exemplary linked list is shown after deallocating element 148 from the list. Unfortunately, the stride between elements 146 and 150 is no longer equal to the stride between the other elements. Additionally, at reference numeral 158, the exemplary list shown at reference numeral 156 is shown with a new element 160 inserted into the interior of the list. Again, the fixed stride distance between subsequent elements within the list is interrupted. Traversing the lists shown at reference numerals 156 and 158 may lead to several mispredicted prefetches. Additional insertions and deletions within the list may lead to additional discontinuities.

Fortunately, an application program may take advantage of the properties of heap management routine 60 to correct the discontinuities in the list. The application program may simply rebuild the list, (i.e. allocate elements beginning at the head of the list and copy the contents of the current elements of the list into the new list). In this manner, the properties of heap management routine 60 may result in a list which again exhibits fixed strides between the elements.

Figure 9:
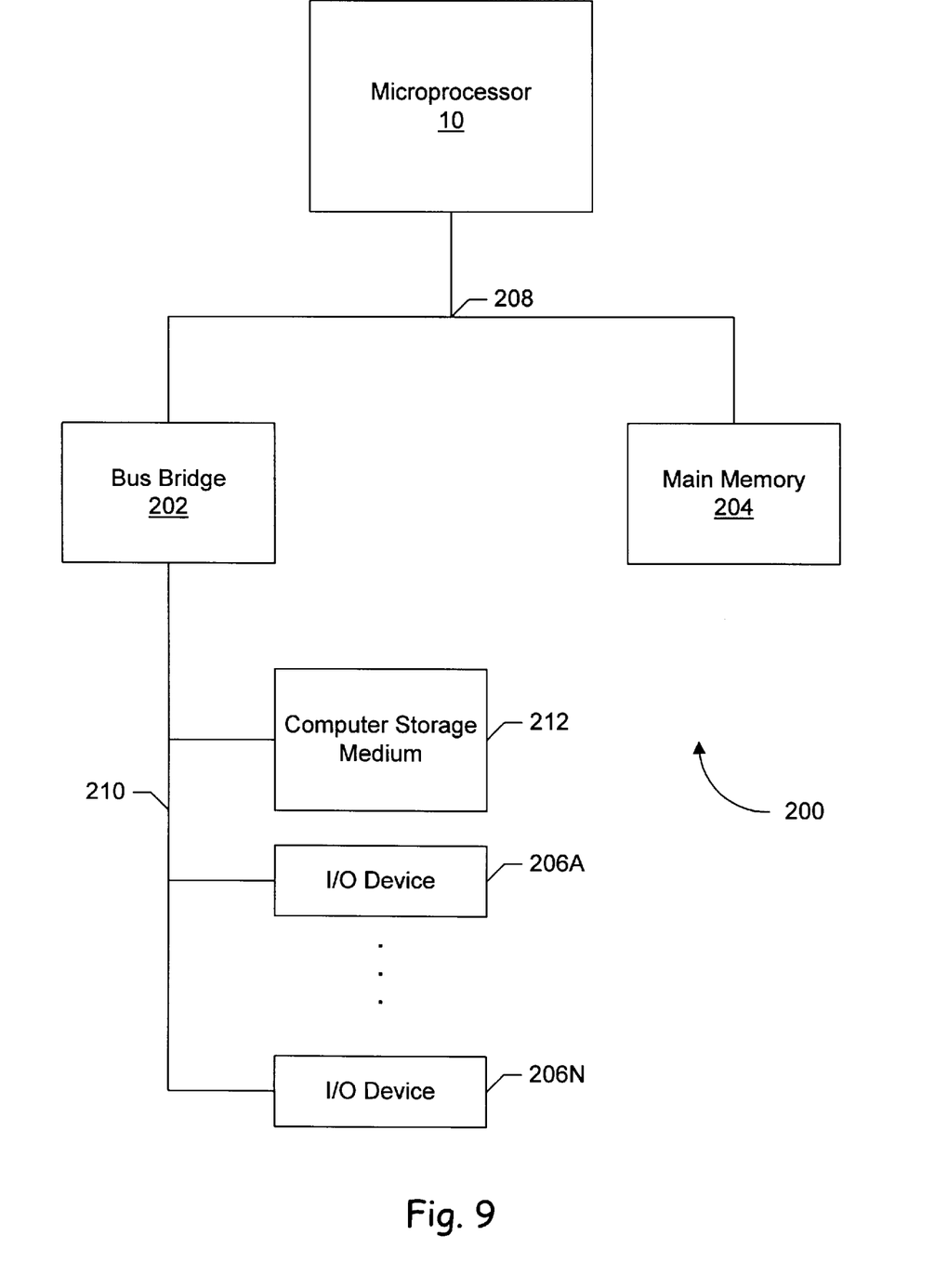
FIG. 9 is a block diagram of one embodiment of a computer system including the microprocessor shown in FIG. 1.

Turning now to FIG. 9, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202. Additionally shown in FIG. 9 is a computer storage medium 212 coupled to I/O bus 210. Alternatively, computer storage medium 212 may be coupled to system bus 208.

Generally, a computer storage medium is a storage medium upon which computer code and/or data may be stored. The code and/or data may be stored in a non-volatile fashion, such as upon a hard disk drive, a compact disk - read only memory (CD-ROM), flash memory, or other non-volatile storage. Alternatively, the storage may be volatile such as a dynamic random access memory (DRAM) or static RAM (SRAM) storage.

Main memory 204 may be an example of a volatile storage. In one embodiment, computer storage medium 212 is configured to store at least heap management routine 60. Heap management routine 60 may be loaded into main memory 204 and executed, and allocation size cache 62, reserve list 64, and free list 66 may be maintained in main memory 204 as well.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 9 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration. It is still further noted that the functions of bus bridge 202, main memory 204, and the cache memory may be integrated into a chipset which interfaces to microprocessor 10. It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value.

In accordance with the above disclosure, a computer system has been shown which includes a dynamic memory allocation routine which attempts to allocate memory in a manner optimized for prefetching. The dynamic memory allocation routine attempts to allocate memory blocks of equal size in contiguous memory locations, thereby allowing a stride-based prefetch algorithm to achieve success when traversing a dynamically allocated data structure built using like-sized elements. Advantageously, performance may be increased through the successful prefetch of data within dynamic data structures.

Numerous variations and modifications will become apparent to those skilled in the art once the above disclosure is fully appreciated. It is intended that the following claims be interpreted to embrace all such variations and modifications.

What is claimed is:

1. A method for dynamic memory allocation in a computer system, comprising:

receiving a first request for dynamic allocation of a first memory block including a first number of bytes;

allocating said first memory block at a first address succeeding a second address corresponding to a last byte of a previously allocated memory block having said first number of bytes;

allocating said first memory block at a third address if said previously allocated memory block has a second number of bytes not equal to said first number of bytes; and reserving a second memory block beginning at said third address and including a third number of bytes equal to a predetermined multiple of said first number of bytes.

2. The method as recited in claim 1 wherein said reserving comprises storing said third address, said first number of bytes, and said third number of bytes in a reserve list.

3. The method as recited in claim 2 further comprising receiving a second request for a dynamic allocation of a third memory block.

4. The method as recited in claim 3 further comprising allocating said third memory block at a fourth address succeeding a fifth address corresponding to a last byte of said first block if said third memory block has said first number of bytes.

5. The method as recited in claim 3 further comprising allocating said third memory block at a sixth address outside of said second memory block if said third memory block has a fourth number of bytes not equal to said first number of bytes.

6. The method as recited in claim 2 further comprising deallocating said first memory block upon receiving a deallocation request for said first memory block.

7. The method as recited in claim 6 further comprising releasing a reservation for said second memory block upon said deallocating said first memory block.

8. The method as recited in claim 7 further comprising deleting said third address, said first number of bytes, and said third number of bytes from said reserve list upon deallocating said first memory block.

9. The method as recited in claim 1 further comprising maintaining an allocation size cache indicating which addresses were previously allocated for memory blocks having different numbers of bytes.

10. The method as recited in claim 1 further comprising comparing said first number of bytes to said different numbers of bytes to determine if said previously allocated memory block has said first number of bytes.

11. A computer storage medium configured to store a dynamic memory management routine which, in response to a first request for a dynamic allocation of a first memory block having a first number of bytes:

allocates said first memory block at a first address contiguous to a second memory block having said first number of bytes;

allocates said first memory block at a second address discontiguous to said second memory block if said second memory block has a second number of bytes not equal to said first number of bytes; and reserves a third memory block beginning at said second address and having a third number of bytes equal to a predetermined multiple of said first number of bytes.

12. The computer storage medium as recited in claim 11, wherein said dynamic memory management routine reserves said third memory block by storing said second address and said third number of bytes in a reserve list.

13. The computer storage medium as recited in claim 12, wherein said dynamic memory management routine further stores said first number of bytes in said reserve list.

14. The computer storage medium as recited in claim 11, wherein said dynamic memory management routine records a third address corresponding to said second memory block in an allocation size cache.

15. The computer storage medium as recited in claim 14, wherein said dynamic memory management routine records said first address in said allocation size cache.

16. A computer storage medium configured to store a dynamic memory management routine which, in response to a first request for a dynamic allocation of a first memory block having a first number of bytes:

allocates said first memory block at a first address contiguous to a second memory block having said first number of bytes;

allocates said first memory block at a second address discontiguous to said second memory block if said second memory block has a second number of bytes not equal to said first number of bytes;

records a third address corresponding to said second memory block in an allocation size cache;

records said first address in said allocation size cache; and overwrites said third address in said allocation size cache if said second memory block has said first number of bytes.

17. The computer storage medium as recited in claim 15, wherein said dynamic memory management routine stores said first address in addition to said third address within said allocation size cache if said second memory block has said second number of bytes.

18. The computer storage medium as recited in claim 15, wherein said dynamic memory management routine further records a number of bytes corresponding to each address in said allocation size cache, whereby said dynamic memory management routine determines if said first memory block and said second memory block comprise equal numbers of bytes.

* * * * *